United States Patent [19]

Downs et al.

[11] 4,336,338

[45] Jun. 22, 1982

[54] HOLLOW MICROSPHERES OF SILICA GLASS AND METHOD OF MANUFACTURE

[75] Inventors: Raymond L. Downs; Wayne J. Miller, both of Ann Arbor, Mich.

[73] Assignee: The United States of America as represented by the United States Department of Energy, Washington, D.C.

[21] Appl. No.: 178,266

[22] Filed: Aug. 15, 1980

[51] Int. Cl.³ .................... C03C 3/00; C03C 3/06; C03C 3/08

[52] U.S. Cl. .................... 501/12; 65/21.4; 65/22; 106/75; 252/317; 264/13; 264/15; 501/27; 501/39; 501/54; 501/65

[58] Field of Search ............ 65/DIG. 14, 22, 21.1, 65/21.2, 21.3, 21.4; 106/40 V, 54, DIG. 8; 252/317; 428/406; 264/13, 15; 501/12, 27, 39, 54, 65

[56] References Cited

U.S. PATENT DOCUMENTS

| | | | |
|---|---|---|---|
| 2,286,275 | 6/1942 | Hood et al. ................... | 106/54 |
| 2,883,347 | 4/1959 | Fisher et al. ................. | 106/40 V X |
| 3,030,215 | 4/1962 | Veatch et al. ................ | 501/39 X |
| 3,365,315 | 1/1968 | Beck et al. ................... | 106/40 V |
| 3,489,579 | 1/1970 | Steverding ................... | 106/54 X |
| 3,699,050 | 10/1972 | Henderson .................. | 106/40 V |
| 3,782,906 | 1/1974 | Pierce ......................... | 106/DIG. 8 |
| 3,799,754 | 3/1974 | Thomas ....................... | 65/134 |
| 3,826,755 | 7/1974 | Grimes et al. ................ | 252/317 X |
| 3,839,998 | 10/1974 | Matthews et al. ............ | 106/DIG. 8 |
| 3,843,376 | 10/1974 | Cornelissen et al. ......... | 106/DIG. 8 |
| 4,017,290 | 4/1977 | Budrick et al. ............... | 65/22 X |
| 4,021,253 | 5/1977 | Budrick et al. ............... | 501/12 |
| 4,059,423 | 11/1977 | De Vos et al. ................ | 65/22 X |
| 4,133,854 | 1/1979 | Hendricks .................... | 501/33 X |
| 4,257,798 | 3/1981 | Hendricks et al. ........... | 65/22 X |
| 4,257,799 | 3/1981 | Rosencwaig et al. ......... | 65/22 X |

FOREIGN PATENT DOCUMENTS

51-34219 3/1976 Japan ..................... 501/35

OTHER PUBLICATIONS

KMS 1977, Annual Report, pp. 1–12.
Souers et al., UCRL 51609 (1974), p. 3.
Yoldas, B. E., "Preparation of Glasses and Ceramics from Metal–Organic Compounds", J. Materials Science 12, Jun. 1977, pp. 1203–1208.

*Primary Examiner*—Helen M. McCarthy
*Attorney, Agent, or Firm*—John A. Koch; Richard G. Besha; James E. Denny

[57] ABSTRACT

A method of manufacturing gel powder suitable for use as a starting material in the manufacture of hollow glass microspheres having a high concentration of silica. The powder is manufactured from a gel containing boron in the amount of about 1% to 20% (oxide equivalent mole percent), alkali metals, specifically potassium and sodium, in an amount exceeding 8% total, and the remainder silicon. Preferably, the ratio of potassium to sodium is greater than 1.5.

15 Claims, 13 Drawing Figures

HOLLOW MICROSPHERES OF SILICA GLASS AND METHOD OF MANUFACTURE

BACKGROUND OF THE INVENTION

The present invention relates to manufacture of hollow glass microspheres, and more particularly to manufacture of "high-silica" glass microspheres from a gel and to the resulting product.

It has been found desirable in the art of manufacturing hollow glass microspheres or shells to provide microspheres constructed essentially of a single oxide, preferably silica. Such single oxide shells avoid many potential problems associated with multiple component glass shells, such as inhomogeneities and phase separation. Essentially pure silica shells are particularly desirable for their high strength and resistance to devitrification. Moreover, essentially pure silica microspheres are considered desirable for use as inertial confinement fusion targets because of controllable and predictable gas permeation characteristics, and because of the high softening temperatures characteristic of silica. However, the high softening temperature of pure silica (1667° C.) presents a major difficulty in attempts to manufacture pure or essentially pure silica microspheres.

In the manufacture of silica microspheres from a glass gel, boron is often added to the gel for lowering the viscosity and, therefore, the softening temperature of the dried and crushed gel. However, the resulting glass microspheres possess a substantial boron concentration. Concerning the manufacture of hollow glass microspheres from gels and a gel powder, reference may be had to the following art: the U.S. patents to Veatch et al Nos. 3,030,215, Beck et al 3,365,315, and Budrick et al 4,017,290 and 4,021,253; Souers et al, "Fabrication of the Glass Microballoon Laser Target", UCRL-51609, Sept. 26, 1974; and 1977 *Annual Report on Laser Fusion Research*, KMS Fusion, Inc., pages 1-12 to 1-15.

A general object of the present invention is to provide a method of manufacturing hollow glass microspheres of essentially pure silica glass. More specifically, an object of the invention is to provide a method of manufacturing hollow glass microspheres composed of at least 99% silica.

Another object of the invention is to provide a gel powder suitable for manufacture of essentially pure silica glass microspheres. A further and related object of the invention is to provide a method of gel formation suitable for manufacture of such frit.

Yet another object of the invention is to provide hollow glass microspheres composed of at least 99% silica.

SUMMARY OF THE INVENTION

In accordance with the invention it has been found that introduction of alkali metals along with boron in the glass gel and powder, specifically potassium and sodium, improves the viscosity/temperature forming properties of the frit, but yields glass microspheres having high concentrations of silica. Indeed, it has been found that, whereas addition of either alkali metals or boron alone to the gel and gel powder yields microspheres with substantial alkali or boron concentrations, addition of both results in substantially complete volatilization of the additives in the forming process to yield a microsphere of more than 99% silica glass. It has also been discovered that formation of the shells in the presence of water vapor materially assists and enhances such additive volatilization.

In the following description and claims, the terms "microspheres" and "shells" are used synonymously and refer to hollow discrete substantially spherical structures having a finite wall thickness. Unless otherwise indicated, all concentrations are expressed in mole percent and all concentration ratios are mole ratios. Concentrations of glass-forming components of the glass gels are expressed in oxide equivalent mole percent. The terms "gel" and "gel powder" are employed in their usual meanings, the term "gel powder" referring specifically to a particle formed by crushing and drying a metal organic gel containing oxidizable metallic glass-forming components and a blowing agent. (The above-referenced Budrick et al Pat. No. 4,021,253 employs the term "frit" for what is termed "gel powder" herein).

BRIEF DESCRIPTION OF THE DRAWINGS

The invention, together with additional objects, features and advantages thereof, will be best understood from the following description, the appended claims and the accompanying drawings in which:

DESCRIPTION OF THE PREFERRED EMBODIMENTS

A number of different glass gel powder and shell samples have been prepared and tested to demonstrate the invention. Two methods of gel preparation were employed:

Gel Method I: Alkaline metals were combined in ethanol under argon, with the amount of ethanol being sufficient to dissolve the alkali metals. The quantities of metals depended upon the desired concentrations of each in the resulting powder. Tetraethoxysilane in an amount sufficient to yield desired powder silica concentration was then added after the metals were fully dissolved. A mixture of 50% ethanol and 50% water (by volume) was then added dropwise to the solution until the result approached gel viscosity. Triethoxyborane was then added in an amount calculated to yield a desired boron concentration in the powder and the solution was allowed to gel. The gel was heated to 55° C. and held for several hours (overnight), and then vacuum dried at 100° C. The gel was then crushed and sieved to yield a gel powder of desired particle size.

Gel Method II: Tetraethoxysilane, ethanol, water and hydrochloric acid were combined and heated to 70° C. The mass ratio of tetraethoxysilane to ethanol was about 2.0 g/ml, with the amount of tetraethoxysilane being such as to yield desired powder silica concentration. The water was in a 1/1 mole ratio to the tetraethoxysilane. The hydrochloric acid was to act as a catalyst and the amount is not critical. A second mixture of potassium and sodium acetates, water and acetic acid was combined to form a clear solution, with the ratio of water to acetic acid being 2/1 by volume. Again, the amounts of potassium and sodium acetates depend upon desired powder concentrations. The two solutions were then combined while stirring. Triethoxyborane was then added and the solution spontaneously gelled. The gel was then dried, crushed and sieved as in Gel Method I.

It will be appreciated that the above-described gels and powders contain oxidizable glass-forming components (silicon, boron, potassium and sodium), and solvents and materials (which may include one or more of the solvents) which will operate as blowing agents. The following table illustrates concentrations of the glass-forming components in terms of oxide-equivalence for five powder specimens tested to demonstrate the invention. (The use of oxide-equivalence when expressing concentrations of the glass-forming components permits expression of such concentrations relative to each other without regard to the other materials in the powder.)

TABLE 1

| Powder Code | Gel Method | Oxide Equivalent Composition (Mole Percent) | | | |
| --- | --- | --- | --- | --- | --- |
| | | $SiO_2$ | $B_2O_3$ | $K_2O$ | $Na_2O$ |
| A | I | 92.3 | 4.4 | 3.3 | 0.0 |
| B | I | 89.83 | 4.45 | 4.61 | 1.1 |
| C | I | 77.3 | 6.4 | 8.2 | 8.2 |
| D | I | 78.77 | 6.52 | 11.98 | 2.73 |
| E | II | 78.77 | 6.52 | 11.98 | 2.73 |

Figure 1:
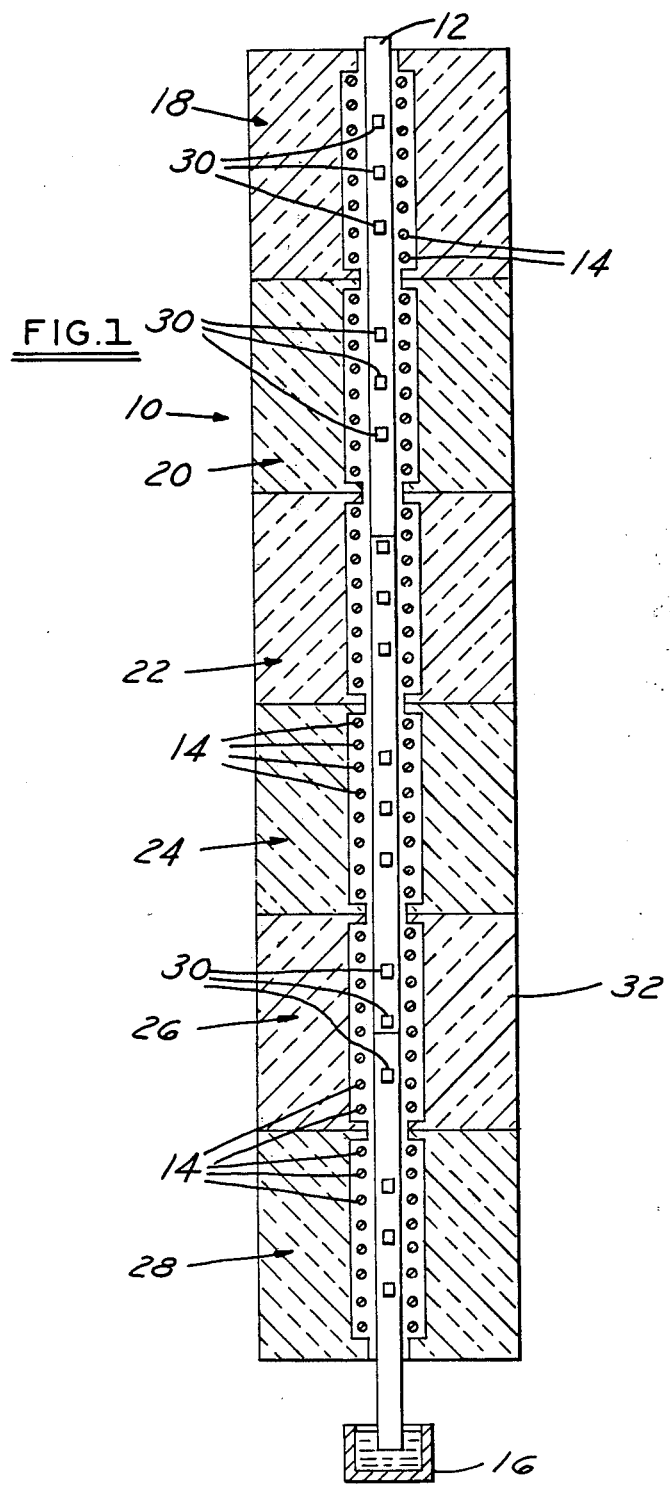
FIG. 1 is a semi-schematic elevational view of an oven for forming glass microspheres from glass frit and is not to scale.
Figure 2:
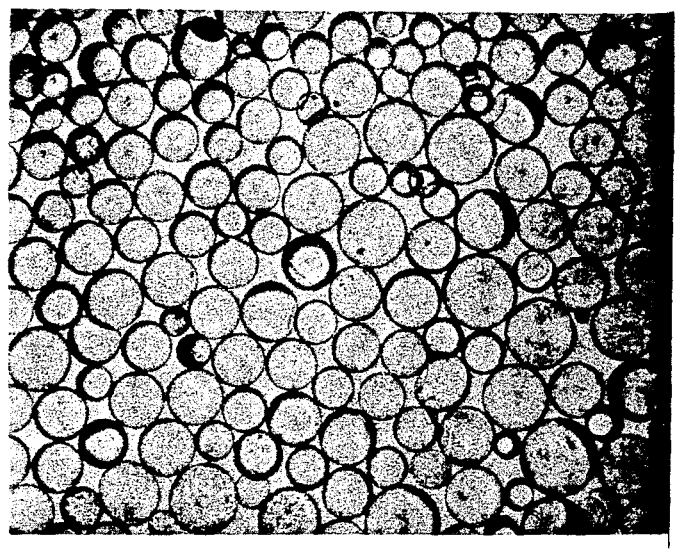
FIG. 2 is a visual photomicrograph at 39X of one example of glass microspheres discussed hereinafter.
Figure 3:
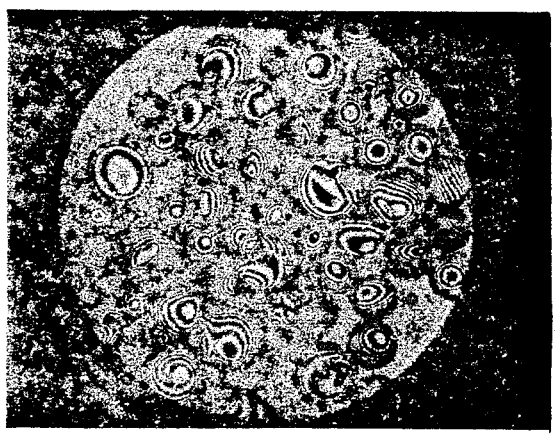
FIG. 3 is an interference photomicrograph of the shells of FIG. 2 at 39X.
Figure 4:
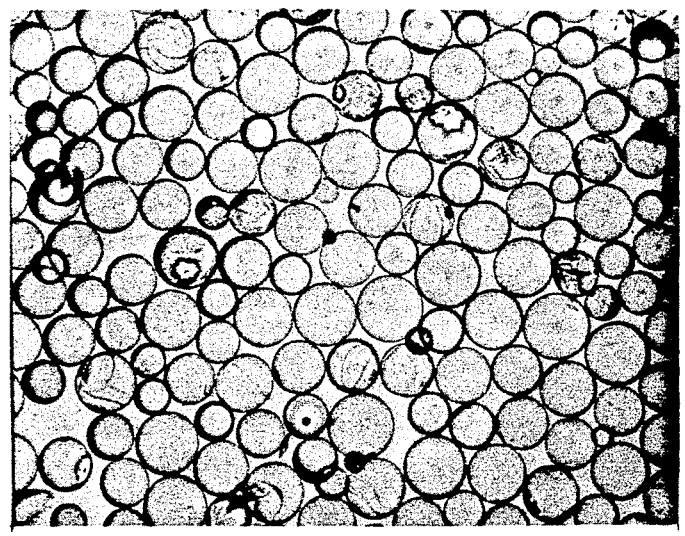
FIGS. 4-13 are photomicrographs at 39X of further shell samples to be discussed and alternately correspond to FIGS. 2 and 3.
Figure 5:
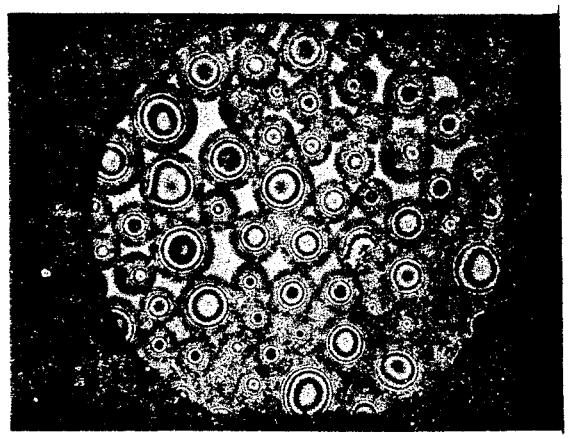
Figure 6:
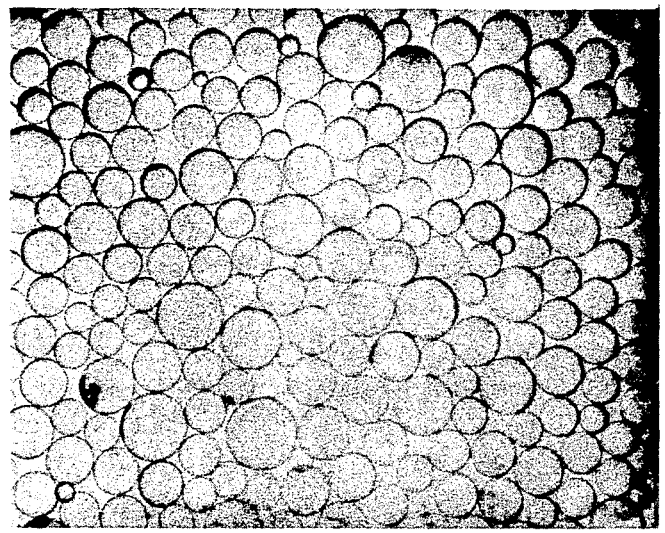
Figure 7:
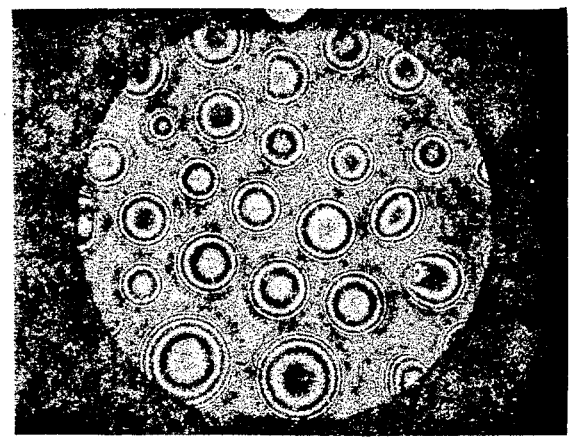
Figure 8:
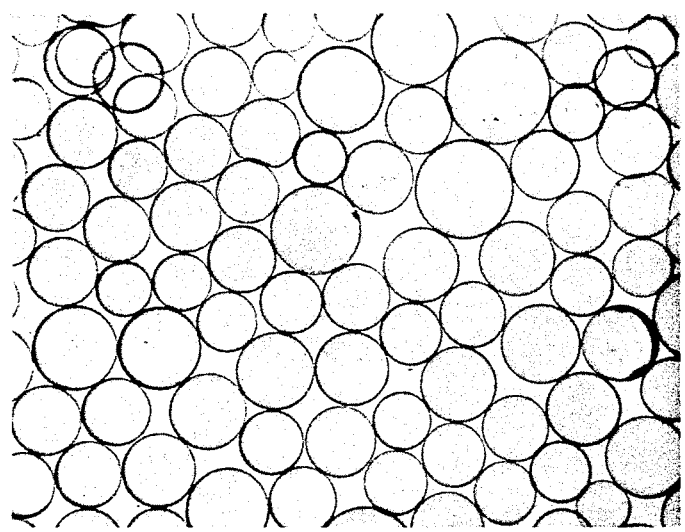
Figure 9:
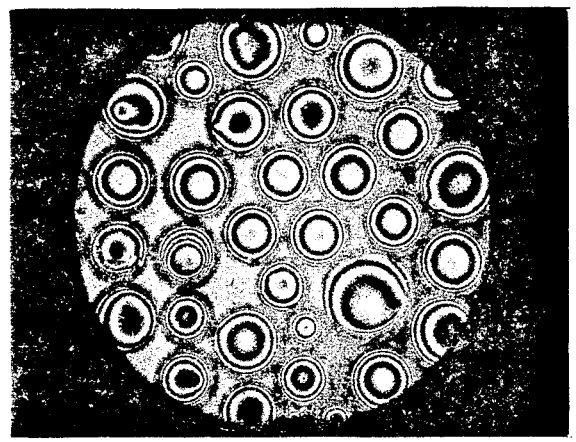
Figure 10:
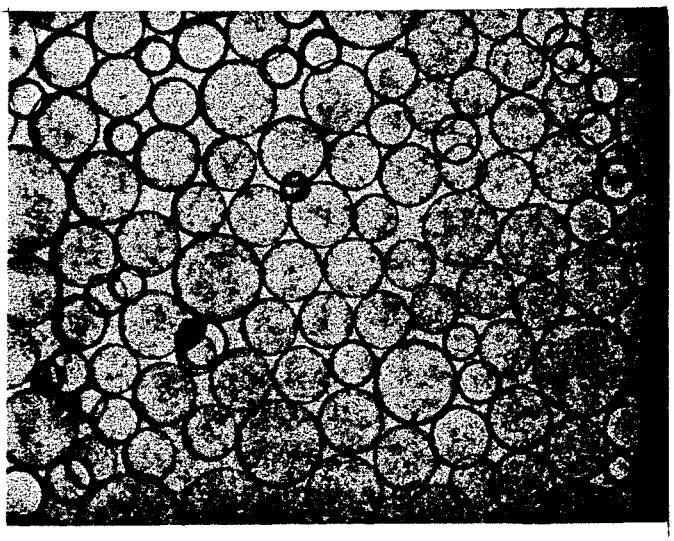
Figure 11:
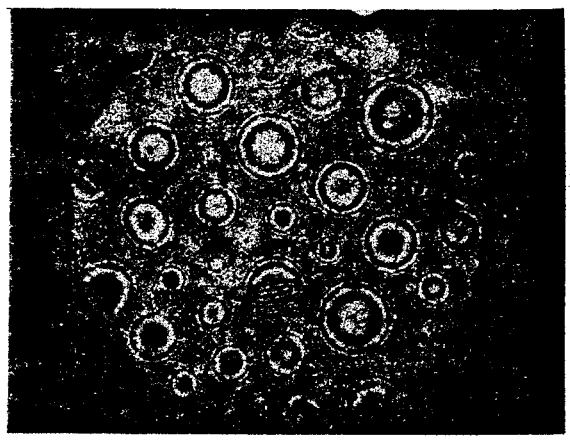
Figure 12:
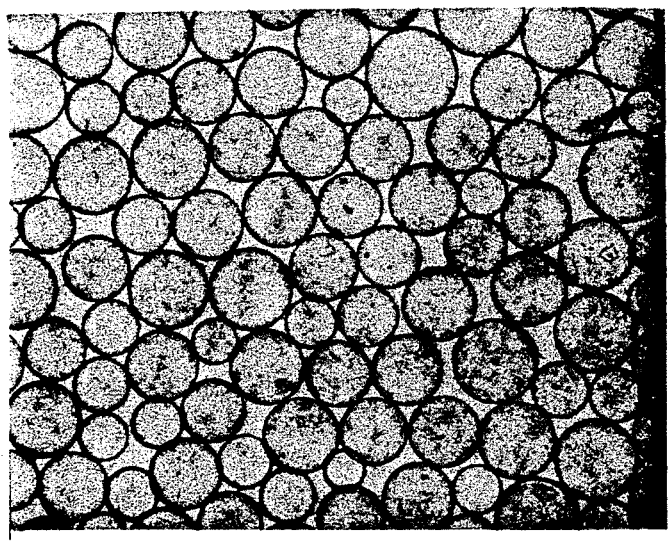
Figure 13:
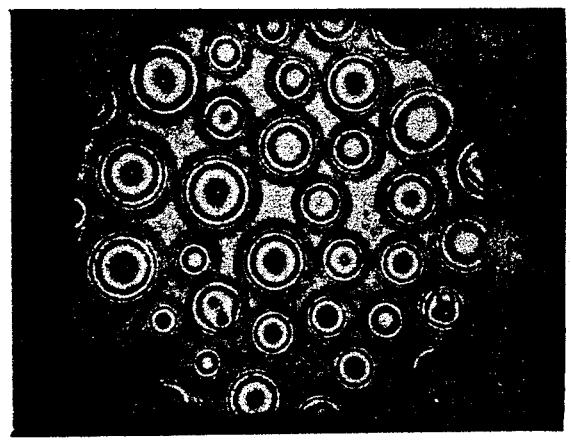

Glass microspheres were formed from the above frit by dropping the powder particles into a tower furnace of the type illustrated in FIG. 1. The furnace 10 of FIG. 1 is similar to that shown in the above-identified Budrick et al U.S. Pat. No. 4,017,290 and comprises a vertical three-section ceramic pipe 12 having a 7.6 cm diameter and an overall high of 3.9 meters. Pipe 12 is heated uniformly by ninety-six silicon carbide heating elements 14. Furnace 10 is divided into six separately controlled and monitored sections 18-28 each having three thermocouples 30 connected to suitable temperature control and recording circuitry (not shown). The overall furnace is encased in a layer of high temperature insulation 32.

The lower end of pipe 12 is submerged in a container 16 of distilled water which serves to seal the bottom of tube 12 and also to provide water vapor in the furnace atmosphere. Some water vapor is considered essential to facilitate the alkali and boron losses required to achieve high silica glass shells in accordance with the invention. The mechanism of the relationship between humidity and shell formation is not fully understood at the present time. However, it has been found that a water temperature of about 60° C. yields adequate humidity. Higher water temperatures and consequently higher water vapor pressures may be employed. Gel powder is fed into the furnace tube at the top either manually, as by a spatula, or by a motorized powder feeder. The powder and resultant shells fall by gravity through the air/water vapor atmosphere of the furnace pipe and are collected in a container of water.

In formation of each of the shell samples set forth in the following table, chamber temperature was held at 1500° C. and a powder particle size in the range of 106–125 μm was utilized:

TABLE 2

| Shell Sample Code | Dwg. FIGS. | Powder Code | Composition (Mole Percent) | | | |
| --- | --- | --- | --- | --- | --- | --- |
| | | | $SiO_2$* | $B_2O_3$ | $K_2O$ | $Na_2O$ |
| A | 2-3 | A | ** | ** | ** | ** |
| B | 4-5 | B | ** | ** | ** | ** |
| C | 6-7 | C | 95.90 | *** | 0.99 | 3.11 |
| D | 8-9 | D | 99.439 | 0.30 | 0.051 | 0.21 |
| D' | 12-13 | D | 99.76 | 0.18 | 0.019 | 0.041 |
| E | 10-11 | E | 99.625 | 0.302 | 0.036 | 0.037 |

*By difference
**Not measured
***Assumed to be zero

Observation of FIGS. 2-13 demonstrates that shell quality increases with powder oxide-equivalent potassium concentration at least in the range of 3.3% to 11.98%. Shell samples A and B, as shown in visual photomicrograph FIGS. 2 and 4, comprised poorer quality microspheres and, for this reason, were not analyzed for final composition. It will be observed, however, in interference photomicrograph FIGS. 3 and 5 that wall uniformity, shown by the degree of concentricity between the interference rings, increased from shell sample A to shell sample B with increasing potassium and sodium concentrations in the gel powders (Table 1).

Powders C produced good quality shells with reasonable wall uniformity (FIGS. 6 and 7) but resulted in lower than desired silica concentration (Table 2). Powders D and E also produced good quality shells with reasonable wall uniformity (FIGS. 8-13) and essentially pure silica shells—i.e. having a silica concentration of more than 99%. Shell sample D' (FIGS. 12 and 13) was run to check repeatability using powder D, which is presently preferred for overall quality and composition. Shell sample D was additionally subjected to inspection by contact microradiography as described in Henderson et al., "Microradiographic Characterization of Laser Fusion Pellets", Rev. Sci. Instrum., 48, 835-840 (July 1977) which showed an average wall non-uniformity of the batch as about 26%.

Shell sample C having the highest powder sodium concentration possesses a significantly lower silica concentration than do shell samples D, D' and E (although such silica concentration in shell sample C is higher than now commercially available in glass microspheres). Thus, it appears from a comparison of shell samples C-E that sodium concentration in the starting powder should vary as a direct function of potassium concentration to obtain essentially pure silica shells of good quality. A potassium/sodium oxide equivalent mole percent ratio in the powder of at least 1.5 appears desirable. A ratio of between 4 and 5 is preferred, as with the ratio of 4.4 in powders D and E. The total alkali oxide concentration (sodium oxide plus potassium oxide) should exceed about 8%, as with powders C, D and E. In particular, total alkali oxide concentration of between 14% and 15% (powders D and E) is preferred at the present time. It is believed that a minimum of about 1% boron in the gel powder is required to produce high silica shells of acceptable quality. Powder compositions having more than 20% boron concentration would probably not produce quality shells having more than 99% silica under any reasonable conditions. Rubidium and cesium are believed to be suitable substituted for potassium.

The exact mechanism by means of which the alkali metals not only themselves volatilize, particularly in the presence of water vapor, but also promote volatilization of the boron is not fully understood. Thus, although trials with gel D at substantially larger powder sizes (330–355 μm sieve cut) at an oven temperature of 1500° C. produced shells with only 93% silica concentration, it is believed that variation of other conditions, such as increasing oven temperature, may permit manufacture of larger essentially pure silica shells. Lowering of oven temperature to 1250° C. using gel D and gel particles in the range of 106–125 μm was also found to decrease ultimate silica concentration to 95%. Again, however, it may be possible to compensate for lower oven temperature, such as by decreasing particle size.

Thus, the invention in its broadest envisions a boron concentration (oxide equivalent) in the starting gel powder in the range of about 1% to 20%, with an intermediate range of about 4% to 10% and particularly about 6% to 7% being preferred; a potassium concentration in the range of about 5% to 25%, with the intermediate range of about 8% to 15% and particularly about 12% being preferred; a sodium concentration of less than about 10%, with an intermediate range of about 1% to 6% and particularly about 2.5% to 3% being preferred; a potassium-to-sodium ratio greater than 1.5, preferably between 4 and 5, and particularly about 4.4; and the remainder consisting essentially of silicon.

Although the invention has been disclosed with particular reference to manufacture of glass microspheres for inertial confinement fusion targets, other potential applications are envisioned. For example, glass microspheres may be used for building insulation or as a lightweight filler in many molded articles of manufacture. For a further discussion of the application of glass microsphere technology, see Wehrenberg et al., "Shedding Pounds in Plastics: Microspheres are Moving", *Mechanical Engineering*, October 1978, pages 58–63.

What is claimed is:

1. A metal organic gel adapted for use as a starting material in the manufacture of hollow glass microspheres, said gel having an oxide equivalent glass composition consisting essentially of oxides of boron in the amount of about 4% to 10%, potassium in the amount of about 8% to 15%, sodium in the amount of about 1% to 10% and the remainder silicon, with a ratio of potassium to sodium in excess of 1.5, and which, when crushed and sieved to a particle size in the range of about 106 μm to 125 μm and formed into hollow glass microspheres at about 1500° C. in the presence of water vapor, is characterized by a silica concentration in excess of 99%.

2. The gel set forth in claim 1 wherein said oxide of boron is in the amount of about 6% to 7%, said oxide of potassium is in the amount of about 12% and said oxide of sodium is in the amount of about 2.5% to 3%.

3. In a method of making a gel particle suitable for use in the manufacture of hollow glass microspheres and which includes the step of forming a gel containing a mixture of glass-forming components, solvents and blowing agents, drying said gel and then crushing said gel, the improvement wherein said gel is formed to contain glass-forming components having an oxide equivalent composition including oxides of boron in the amount of about 6% to 7%, potassium in the amount of about 12%, sodium in the amount of about 2.5% to 3% and the remainder silicon.

4. The method set forth in claim 3 comprising the additional steps of sieving the crushed gel to obtain particles in the range of 106 μm to 125 μm and then forming said hollow glass microspheres by dropping said particles into an oven in the presence of water vapor at an oven temperature on the order of 1500° C.

5. In a hollow glass microsphere consisting essentially of oxides of silicon, boron, potassium and sodium, the improvement wherein the concentration in mole percent of said oxide of silicon is at least 99%.

6. A gel powder for manufacture of hollow glass microspheres having an oxide equivalent glass composition consisting essentially of oxides of boron in the range of about 6% to 7%, sodium in the amount of about 1% to 10%, potassium in the amount of about 5% to 25%, and the remainder silicon.

7. A gel powder for manufacture of hollow glass microspheres having an oxide equivalent glass composition consisting essentially of oxides of boron in the range of about 6% to 7%, sodium in the amount of about 1% to 6%, potassium in the amount of about 8% to 15%, the mole ratio of oxide of potassium to oxide of sodium being greater than 1.5, and the remainder silicon.

8. A gel powder for manufacture of hollow glass microspheres having an oxide equivalent glass composition consisting essentially of oxides of boron in the range of about 6% to 7%, sodium in the amount of about 2.5 to 3%, potassium in the amount of about 12%, and the remainder silicon.

9. A method of manufacturing hollow microspheres having a uniform wall thickness and a silica concentration in excess of ninety-five mole percent comprising the steps of:
 (a) providing a gel powder by forming a metal organic gel having at least one blowing agent and an oxide-equivalent composition of glass forming components consisting essentially of oxides of boron in the range of about 1% to 20%, sodium in the amount of about 1% to 10%, other alkali metals selected from the group consisting of potassium, rubidium and cesium in the range of about 5% to 25%, the mole ratio of said other alkali metals to said sodium being in excess of 1.5, and the remainder silica, and then drying, crushing and sieving said gel to yield said gel powder, and
 (b) forming said hollow glass microspheres in a blowing operation by subjecting said gel powder to elevated temperature in the presence of water vapor to promote mutual volatilization of said oxides of boron, sodium and other alkali metals, and thereby yield said microspheres having a silica concentration in excess of 95%.

10. The method set forth in claim 9 wherein said other alkali metals consist essentially of potassium, and wherein said oxide of sodium is in the amount of about 1% to 6% and said oxide of potassium is in the amount of about 8% to 15%.

11. The method set forth in claim 10 wherein said ratio is between 4 and 5.

12. The method set forth in claim 11 wherein said oxide of sodium is in the amount of about 2.5% to 3% and said oxide of potassium is in the amount of about 12%.

13. The method set forth in claim 10 or 12 wherein said oxide of boron is in the amount of about 4% to 10%.

14. The method set forth in claim 13 wherein said oxide of boron is in the amount of about 6% to 7%.

15. A hollow glass microsphere manufactured in accordance with the method set forth in claim 4 having a silica concentration in excess of 95 mole percent.

* * * * *